United States Patent
Scheiblauer et al.

(10) Patent No.: US 10,965,458 B2
(45) Date of Patent: *Mar. 30, 2021

(54) SYSTEMS AND METHODS TO SECURE SEARCHABLE DATA HAVING PERSONALLY IDENTIFIABLE INFORMATION

(71) Applicant: WOOKEY Search Technologies Corporation, San Francisco, CA (US)

(72) Inventors: Nicolas J. Scheiblauer, Santa Cruz, CA (US); Aaron Torres, Tukwila, WA (US); Christopher Allen Nowell, Calgary (CA)

(73) Assignee: WOOKEY Search Technologies Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/586,600

(22) Filed: Sep. 27, 2019

(65) Prior Publication Data

US 2020/0028680 A1 Jan. 23, 2020

Related U.S. Application Data

(63) Continuation of application No. 15/599,230, filed on May 18, 2017, now Pat. No. 10,476,674.

(51) Int. Cl.
*H04L 29/06* (2006.01)
*H04L 9/08* (2006.01)
(Continued)

(52) U.S. Cl.
CPC .......... *H04L 9/0894* (2013.01); *G06F 16/951* (2019.01); *G06F 21/6254* (2013.01);
(Continued)

(58) Field of Classification Search
CPC ... H04L 9/0894; H04L 9/0866; H04L 9/3239; G06F 21/6254; G06F 16/951; G06F 2221/2107
See application file for complete search history.

(56) References Cited

U.S. PATENT DOCUMENTS 6,233,686 B1 * 5/2001 Zenchelsky ......... H04L 63/0263
726/1
8,365,247 B1 1/2013 Wiese et al.
(Continued)

FOREIGN PATENT DOCUMENTS

EP 0854621 A1 * 7/1998 ......... H04L 63/0263
WO WO-2017097344 A1 * 6/2017 ........... G06F 21/602

OTHER PUBLICATIONS

Wikipedia, Galois/Counter Mode, last modified on Feb. 23, 2017, retrieved from https://en.wikipedia.org/wiki/Galois/Counter_Mode on Mar. 15, 2017.
(Continued)

*Primary Examiner* — John B King
(74) *Attorney, Agent, or Firm* — Greenberg Traurig

(57) ABSTRACT

A method implemented in a computing system hosting a three-dimensional virtual reality world. The computer system stores a set of searchable records, each having: a searchable hash of at least a portion of personally identifiable information; and an encrypted identity, decryptable using an encryption key generated based at least in part on the searchable hash and a global key. In response to a search request identifying at least a portion of personally identifiable information as a search criterion, the computer system generates a hash of the search criterion, and finds a matching searchable record that has a searchable hash equal to the hash computed from the search criterion. An encryption key is computed based on the global key and the matched searchable record to decrypt an encrypted identity of a user having at least the portion of personally identifiable information that is the search criterion in the search request.

20 Claims, 11 Drawing Sheets

(51) Int. Cl.
*G06F 16/951* (2019.01)
*G06F 21/62* (2013.01)
*H04L 9/32* (2006.01)

(52) U.S. Cl.
CPC .......... *H04L 9/0866* (2013.01); *H04L 9/3239* (2013.01); *G06F 2221/2107* (2013.01)

(56) References Cited

U.S. PATENT DOCUMENTS

| | | | |
|---|---|---|---|
| 9,129,118 | B1 | 9/2015 | Johansson et al. |
| 9,317,715 | B2 | 4/2016 | Schuette et al. |
| 10,397,115 | B1* | 8/2019 | Hasani ................ H04L 45/7453 |
| 10,410,015 | B2 | 9/2019 | Scheiblauer et al. |
| 10,476,674 | B2 | 11/2019 | Scheiblauer et al. |
| 2001/0019614 | A1 | 9/2001 | Madoukh |
| 2003/0131266 | A1* | 7/2003 | Best ........................ H04L 67/02 713/184 |
| 2007/0282832 | A1 | 12/2007 | Herley et al. |
| 2011/0112970 | A1 | 5/2011 | Yu |
| 2011/0197159 | A1 | 8/2011 | Chaganti et al. |
| 2012/0066508 | A1 | 3/2012 | Lentini |
| 2013/0111210 | A1 | 5/2013 | Ravi et al. |
| 2013/0219456 | A1 | 8/2013 | Sharma et al. |
| 2014/0052999 | A1 | 2/2014 | Aissi et al. |
| 2014/0237252 | A1 | 8/2014 | Hursti |
| 2015/0086019 | A1* | 3/2015 | Tamminen ............... G09C 1/00 380/278 |
| 2015/0310174 | A1 | 10/2015 | Coudert et al. |
| 2016/0034713 | A1 | 2/2016 | Ramirez |
| 2016/0323229 | A1 | 11/2016 | Le Jouan |
| 2017/0013011 | A1 | 1/2017 | Renouil et al. |
| 2017/0017804 | A1 | 1/2017 | Rajkumar et al. |
| 2017/0222804 | A1 | 8/2017 | Dewitt et al. |
| 2017/0237717 | A1 | 8/2017 | Starosielsky et al. |
| 2017/0364920 | A1 | 12/2017 | Anand |
| 2018/0024838 | A1* | 1/2018 | Nachimuthu ....... G06F 13/1668 713/1 |
| 2018/0062995 | A1 | 3/2018 | Naar |
| 2018/0114188 | A1 | 4/2018 | Miller et al. |
| 2018/0293314 | A1 | 10/2018 | Munley |
| 2018/0336366 | A1 | 11/2018 | Scheiblauer et al. |
| 2018/0337778 | A1 | 11/2018 | Scheiblauer et al. |
| 2019/0362098 | A1 | 11/2019 | Scheiblauer et al. |

OTHER PUBLICATIONS

Wikipedia, Initialization vector, last modified on Jul. 23, 2016, retrived from https://en.wikipedia.org/wiki/Initialization_vector on Mar. 22, 2017.

Wikipedia, Padding (cryptography), last modified on Jul. 11, 2016, retrieved from https://en.wikipedia.org/wiki/Padding_(cryptography) on Mar. 15, 2017.

Wikipedia, scrypt, last modified on Feb. 24, 2017, retrieved from https://en.wikipedia.org/wiki/Scrypt on Mar. 15, 2017.

U.S. Appl. No. 15/599,158, filed May 18, 2017, Nicolas Scheiblauer et al.

U.S. Appl. No. 15/536,205, filed Aug. 8, 2019, Nicolas Scheiblauer et al.

U.S. Appl. No. 15/599,230, filed May 18, 2017, Nicolas Scheiblauer, et al.

* cited by examiner

SYSTEMS AND METHODS TO SECURE SEARCHABLE DATA HAVING PERSONALLY IDENTIFIABLE INFORMATION

RELATED APPLICATIONS

The present application claims priority to and is a continuation application of U.S. patent application Ser. No. 15/599,230, filed on May 18, 2017, entitled "Systems and Methods to Secure Searchable Data having Personally Identifiable Information," the entire disclosure of which is hereby incorporated herein by reference.

The present application is related to U.S. patent application Ser. No. 15/599,158, filed on May 18, 2017, issued as U.S. Pat. No. 10,410,015 on Sep. 10, 2019, and entitled "Systems and Methods to Secure Personally Identifiable Information," the entire disclosure of which is hereby incorporated herein by reference.

FIELD OF THE TECHNOLOGY

At least some technologies disclosed herein relate to information security in general and more specifically but not limited to prevention of unauthorized access to personally identifiable information of users of a three-dimensional virtual world.

BACKGROUND

Computer technologies have developed for the presentation of three-dimensional virtual worlds to users of computing devices.

For example, a virtual world can be hosted on a set of server computers (e.g., secondlife.com). Client programs or viewers can be installed on user computers for connections to the server computers and for user participation in the virtual world. Users of a virtual world can be presented as the residents of the virtual world in the form of avatars. The resident avatars can travel in the three-dimensional virtual world, explore the three-dimensional virtual world, meet other resident avatars for virtual social activities, and communicate with each other via voice, instant messaging, text chart, local chat, and/or group chat. The avatars may build, create, shop and trade virtual objects and services with each other in the three-dimensional virtual world.

Avatars of a virtual world may take various forms, such as human, animal, vegetable, etc. In a virtual world, users may customize various aspects of their avatars and may choose to resemble the users themselves in appearance as they are in the real world. A user may have multiple avatars, but use only one avatar at a time for participation in the virtual world.

In a virtual world, a user of a client program or viewer of the virtual world can use conventional input devices to control the activities of the avatar that represents the user in the virtual world, such as keyboards and pointer control device (e.g., mouse, touch pad, track ball, joystick, and touch screen). The view of the virtual world as currently being seen by the avatar at its current position and orientation can be presented on a display device, such as a computer monitor, a display of a notebook computer, and a touch screen of a mobile device.

Users of the virtual world are typically required to register with a computer system that hosts the virtual world. The registration information of the users may include personally identifiable information, which is typically organized in the accounts of the users, together with the resources and data allocated to and/or acquired by the users, such as the avatars of the users, virtual objects and/or currencies acquired by the users, the preferences of the users, etc.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
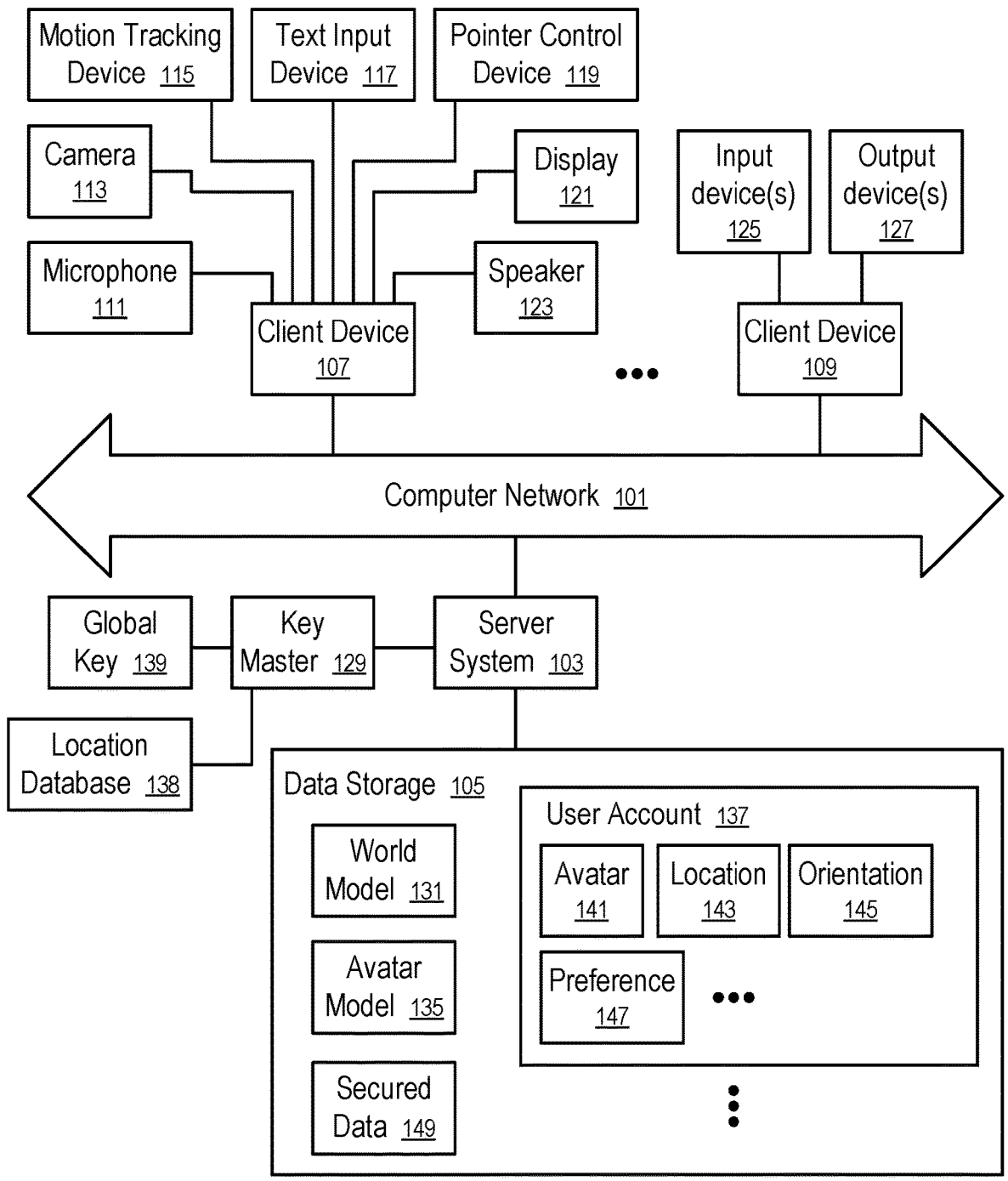
FIG. 1 shows a computer system in which techniques of the present disclosure can be used.

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

A computing system hosting a virtual world may collect personally identifiable information (PII) of users during the registration process to create the accounts of the users. The personally identifiable information (PII) of users may be stored but infrequently used during the presentation of the virtual world to the users.

The techniques of the present disclosure improve the security of the storage of the personally identifiable information (PII) of the users. The techniques prevent and/or deter unauthorized discovery of the personally identifiable information of the users even when the database storing the personally identifiable information (PII) is stolen.

In one aspect, a dynamically generated encryption key is used to encrypt or decrypt the data of a particular field of personally identifiable information of a particular account. Different encryption keys are used for different fields of personally identifiable information of a particular account; and different encryption keys are used for a particular field of personally identifiable information of different accounts. For example, the encryption keys are dynamically generated by a key master of the computing system in response to authorized requests. The dynamically generated encryption keys are not stored for improved security. Preferably, the dynamically generated encryption keys are computed using a resource-intensive password-based key derivation function, such as the scrypt function in cryptography.

Password-based key derivation functions are generally computationally intensive. However, some password-based key derivation functions, such as the scrypt function, are not only computationally intensive, but also resource intensive, which discourages a large scale parallel attack implemented by building a multitude of hardware implementations to separately search different subsets of the key space.

The techniques of the present disclosure use different derived keys for different data fields and for different accounts to prevent and/or deter brute-force attacks.

In another aspects, the techniques of the present disclosure randomize the storage locations of different data fields of the personally identifiable information of a particular account such that the associations of the data fields with each other for an account is absence from the database. Thus, even if the data fields in the database are decrypted via a brute-force attack, it is a challenge to link multiple data fields to one account.

For example, when a user registers for an account to access a three-dimensional virtual world, the user may be required to submit personally identifiable information, such as the first name and last name of the user, an email address of the user, a street address of the user, the city, state, country and postal/zip code of the user, at least a portion of a government issued identification number (e.g., the last four digits of a social security number, a driver's license number, a passport number, a state-issued identification number), the day, month and year of the birth date of the user, a phone number of the user, a billing/payment address, a photo ID, etc.

After the registration, the user is provided with an account identifier and the personally identifiable information is stored for the account identified by the account identifier. Access to the three-dimensional virtual can be in the form of an avatar acquired in the account and positioned in the three-dimensional virtual world. The avatar represents the account and/or the user.

A typical avatar in a three-dimensional virtual world has a position and orientation. A user device provides inputs to control the position and orientation of the avatar in the virtual world to simulate the experience of traveling in the virtual world by presenting the virtual world from the point of view of the position and orientation of the avatar. The virtual reality system (e.g., a server system and/or the client program/viewer) renders a view of the virtual world based on position and orientation of the avatar and presents the view of the virtual world on the user device. The view of the virtual world includes other avatars in the field of view of the avatar, and other virtual objects, such as virtual building, parks, theaters, streets, etc.

Within the view of the virtual world, the virtual reality system may identify a set of objects or avatars that may be of particular interest to the avatar. For examples, when an avatar speaks to a nearby listening avatar, the listening avatar may become a point of interest for the gaze of the speaking avatar. For examples, when an avatar listens to a nearby speaking avatar, the speaking avatar may become a point of interest for the gaze of the listening avatar. For examples, when an avatar speaks to a group of avatars, the avatars in the group may become potential points of interest for the gaze of the speaking avatar. A computer system hosting the virtual world renders a view of the virtual world from the point of the gaze of the avatar and the present the view to the user of the avatar, as if the user of the avatar is viewing the virtual world according to the gaze of the avatar.

FIG. 1 shows a computer system in which techniques of the present disclosure can be used.

In FIG. 1, a server system (103) has a data storage (105) storing a three dimensional world model (131) and avatar models (135). The virtual world represented by the model (131) may or may not resemble a part of the real world on the Earth. Client devices (107, . . . , 109) can be used to access the virtual world via the server system (103). For example, the server system (103) may generate a view of the virtual world and provide the view to a client device (109) for display. For example, the server system (103) may extract a portion of the world model (131) and the avatar model (135) relevant for the display of the view for the client device (109); and the client device (109) constructs a view of the portion of the virtual world from the data extracted and provided by the server system (103).

In FIG. 1, a user of the server system (103) has a user account (137) stored in the data storage (105). The user account (137) hosts information such as the identification of an avatar (141) of the user in the virtual world, the location (143) and orientation (145) of the avatar (141) in the virtual world, preferences (147) of the user, such as the personalization parameters of the avatar (141).

After a user of a client device (109) is authenticated for the authorization to access the virtual world via the user account (137), the input devices (125) of the client device (109) provide user inputs to control the location (143) and orientation (145) of the avatar (141) of the user; and the server system (103) provides a data stream to the client device (109) according to the location (143) and the orientation (145) of the avatar (141) such that the client device (109) presents, on the output device (127), the view of the virtual world that is perceived to be seen in the eyes of the avatar (141). The view of the virtual world simulates the experience of a user in the virtual world at the location (143) and orientation (145) of the avatar (141); and the display of the virtual world on the client device (109) corresponds to the presentation of a video stream captured by a virtual camera at a location (143) and orientation (145) of the avatar (141). Since the view is in the eyes of the avatar (141), the view generally does not include the avatar (141) itself and more specifically the eyes of the avatar (141). However, the avatar (141) itself and the eyes of the avatar (141) can be in the views of other avatars that are in the vicinity of the avatar (141).

Examples of the input devices (125) include a text input device (117) (such as a keyboard, a virtual keyboard implemented on a touch screen, text input implemented via speech recognition), a pointer control device (e.g., arrow keys of a keyboard, a mouse, a track ball, a touch pad, a touch screen, a joystick), a motion tracking device (e.g., motion sensors attached to a head-mount display, data glove, mobile phones, personal media player, mobile computing device, game controller), a digital camera (113), a microphone (111), etc.

Examples of the output devices (127) include a display (121) (e.g., a computer monitor, a touch screen, a head-mount display, a virtual reality headset) and a speaker (123) (or earphone, headphone).

In some instances, a client device (109) has an eye-tracking capability (e.g., via a head-mount camera (113) that capture video images of the eyes of the user, a front facing camera (113) of a smart phone, a tablet computer, a mobile device), which makes it possible to control the eye movements of an avatar (141) and/or the field of view of the avatar (141) independent of the movement of the location (143) and orientation (141) of the avatar (141) as a whole.

In some instances, when the client device (109) does not have an eye-tracking capability, the system is configured to present eye movements based on predictions, eye movement models, preferences (147), and other inputs from other devices (e.g., 117, 119). For example, predetermined patterns of eye movements are animated based on predetermined models. Thus, the experiences of the user of the avatar (141) can be improved, as well as the experiences of other users interacting with the avatar (141) of the user in the virtual world.

The system of FIG. 1 can also be used for the presentation of augmented reality, where virtual representations of users in the form of avatars are projected into a view of a real world. The avatars may have the form of a human and/or be generated based on images of the users of the avatars so that the avatars resemble the users in real world.

FIG. 1 illustrates the use of a centralized server system (103) to host the virtual world represented by the world model (131). In other implementations, the virtual world may be hosted on a distributed computer network.

In FIG. 1, the server system (103) has a key master (129) that maintains the global key (139) for the derivation of encryption keys for different data fields of personally identifiable information of different accounts (e.g., 137). The encrypted data is stored as the secured data (149).

Preferably, the derived encryption keys are not stored in the system. Thus, the intensive computation and resources required to apply a brute-force attack on the secured data (149) prevent and/or deter the unauthorized discovery of personally identifiable information in the secured data (149). Further, encrypted content of different data fields are stored in randomized locations in the secured data (149); and a location database (138) is used to store the identifications of the storage locations of the encrypted content in the secured data (149).

Figure 2:
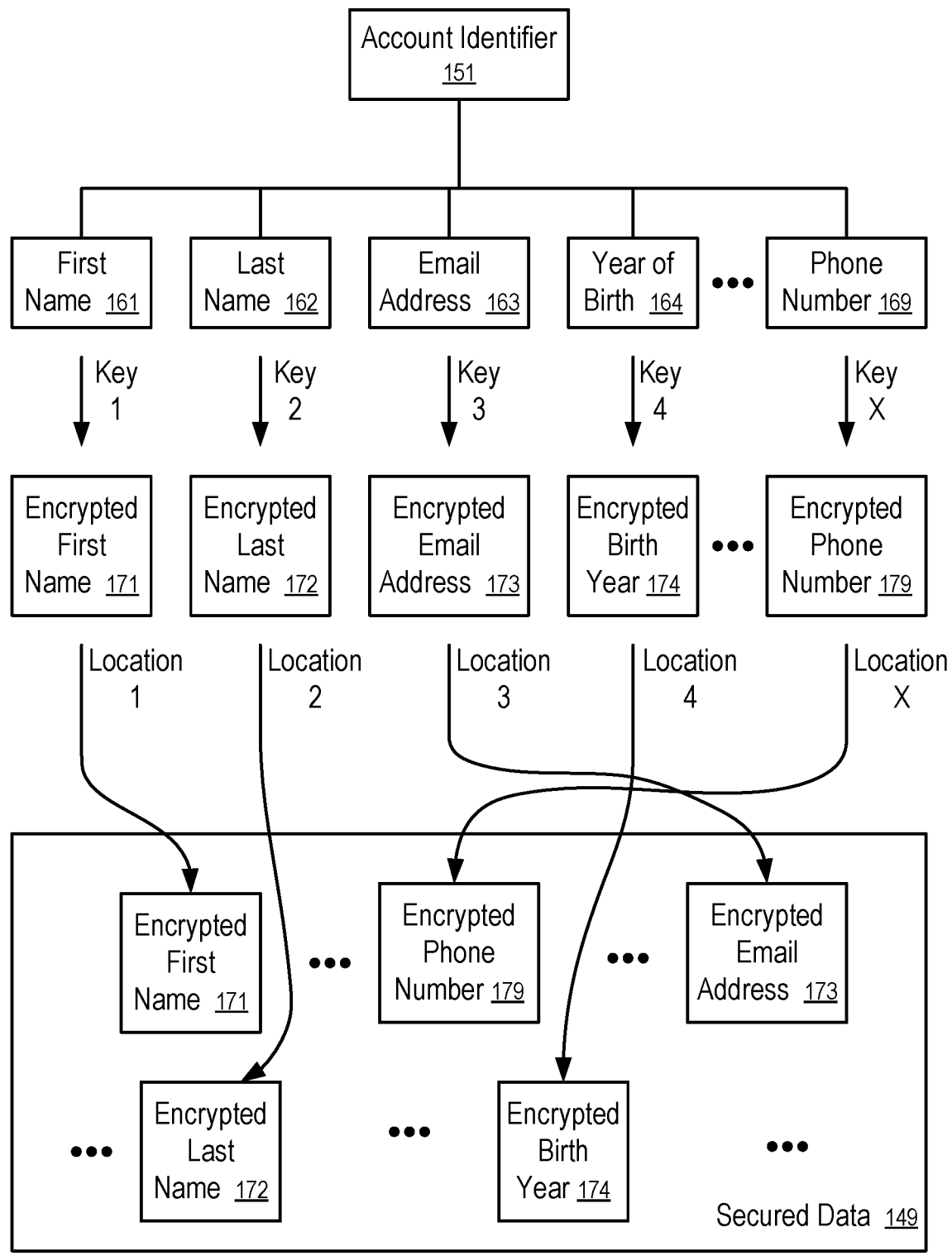
FIG. 2 illustrates a technique to store personally identifiable information according to one embodiment.

FIG. 2 illustrates a technique to store personally identifiable information according to one embodiment. For example, the technique of FIG. 2 can be used in the system of FIG. 1.

In FIG. 2, an account identifier (151) identifies the user account (137). The user of the account (137) submits personally identifiable information that has various data fields, such as first name (161), last name (162), email (163), year of birth (164), ..., phone number (169).

In FIG. 2, each of the data fields (161, 162, 163, 164, ..., 169) for the specific account identifier (151) has a unique encryption key to generate corresponding one of the encrypted data (171, 172, 173, 174, ..., 179). The encryption key for one of the data field cannot be used to decrypt the encrypted data of another data field; and the encryption keys for the data fields (161, 162, 163, 164, ..., 169) for the account identifier (151) cannot be used to decrypt the encrypted data of corresponding data fields of another account identifier.

In FIG. 2, the secure data (149) stores the encrypted data items (171, 172, 173, 174, ..., 179) in a way that reveals no connection among the encrypted data items (171, 172, 173, 174, ..., 179). For example, the encrypted data items (171, 172, 173, 174, ..., 179) can be stored in random locations in the secured data (149) (e.g., a database file) and the encrypted data items (171, 172, 173, 174, ..., 179) for the account identifier (151) can be interleaved with encrypted data items for other account identifiers. Thus, the secured data (149) has insufficient information or structure to link a set of encrypted data items (171, 172, 173, 174, ..., 179) to a particular account in general and to the account identifier (151) in particular. Thus, even if a brute-force attack decrypts the encrypted phone number (179) and the encrypted email address (173), the secured data (149) lacks any indication to link the encrypted phone number (179) and the encrypted email address (173) together as the information of a same user.

Optionally, the locations of the encrypted date items (171, 172, 173, 174, ..., 179) in the secured data are stored in a separate storage location/device (e.g., in a location database (138) separate from the data storage device (105) of the secured data (149)) to reduce the likelihood that both the location data and the secured data (149) are stolen. Different access controls can be applied to the access to the encrypted date items (171, 172, 173, 174, ..., 179) and the location database (138)

Further, locations can be stored in an encrypted form (e.g., encrypted using the corresponding keys of the corresponding encrypted data item, or different key(s)). For example, the location for storing the encrypted email address (173) in the secured data (149) can be encrypted by the same key that encrypts the encrypted email address (173), or a separate key, and stored in a location database (138) separate from the secured data (149). To retrieve the encrypted email address (173) from the secured data (149), the server system (103) queries the location database (138) (e.g., via the key master) using the account identifier (151) and an identification of the data field of email address; and in response, the server system (103) obtains the encrypted location for the encrypted email address (173) in the secured data (149). After decrypting the encrypted location, the server system (103) retrieves the encrypted email address (173) from the secured data (149) using the decrypted location.

Figure 3:
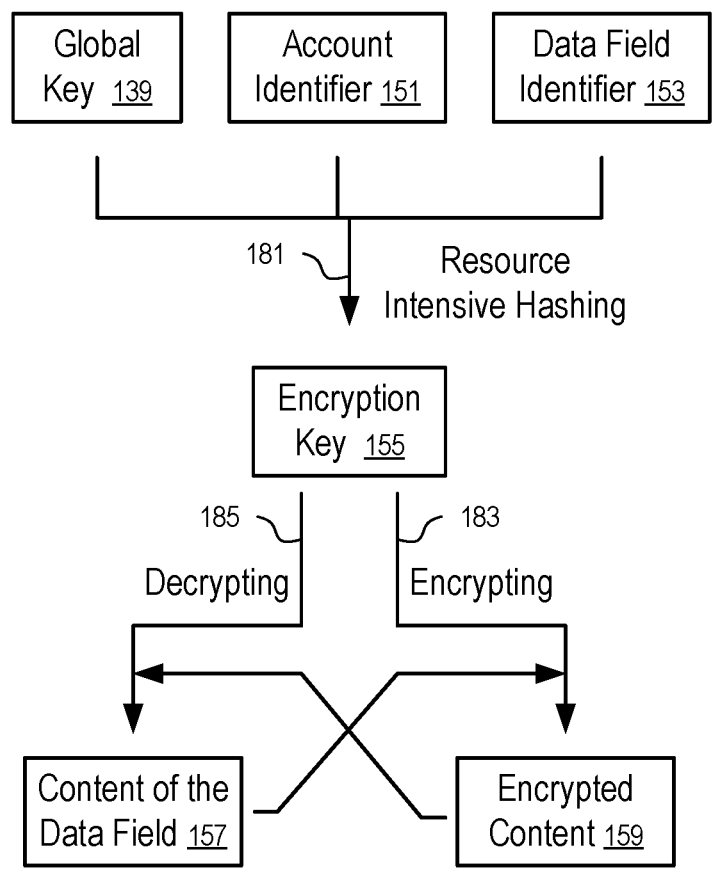
FIG. 3 shows a technique to generate an encryption key according to one embodiment.

FIG. 3 shows a technique to generate an encryption key according to one embodiment. For example, the technique of FIG. 3 can be used to derive the separate keys for the encryption of the data fields (161, 162, 163, 164, ..., 169) illustrated in FIG. 2.

In FIG. 3, the encryption key (155) is generated from a resource intensive hashing (181) of at least the global key (139) that is a secret kept by the key master (129), the account identifier (151), and an identifier (153) of the data field (e.g., 161, 162, 163, 164, ..., 169). For example, the identifier data field (153) can be a predetermines string for a same type of data fields (e.g., "email", "phone number") or a predetermined number that represents the type of the data field.

Preferably, a resource-intensive password-based key derivation function, such as the scrypt function, is used to perform the hashing (181) in generating the encryption key (155).

In FIG. 3, a symmetric encryption method is used, where the same key (155) is used to convert the content of the data field (157) into the encrypted content (159) in encrypting (183) and to convert the encrypted content (159) back to the content of the data field (157) in decrypting (185).

Figure 4:
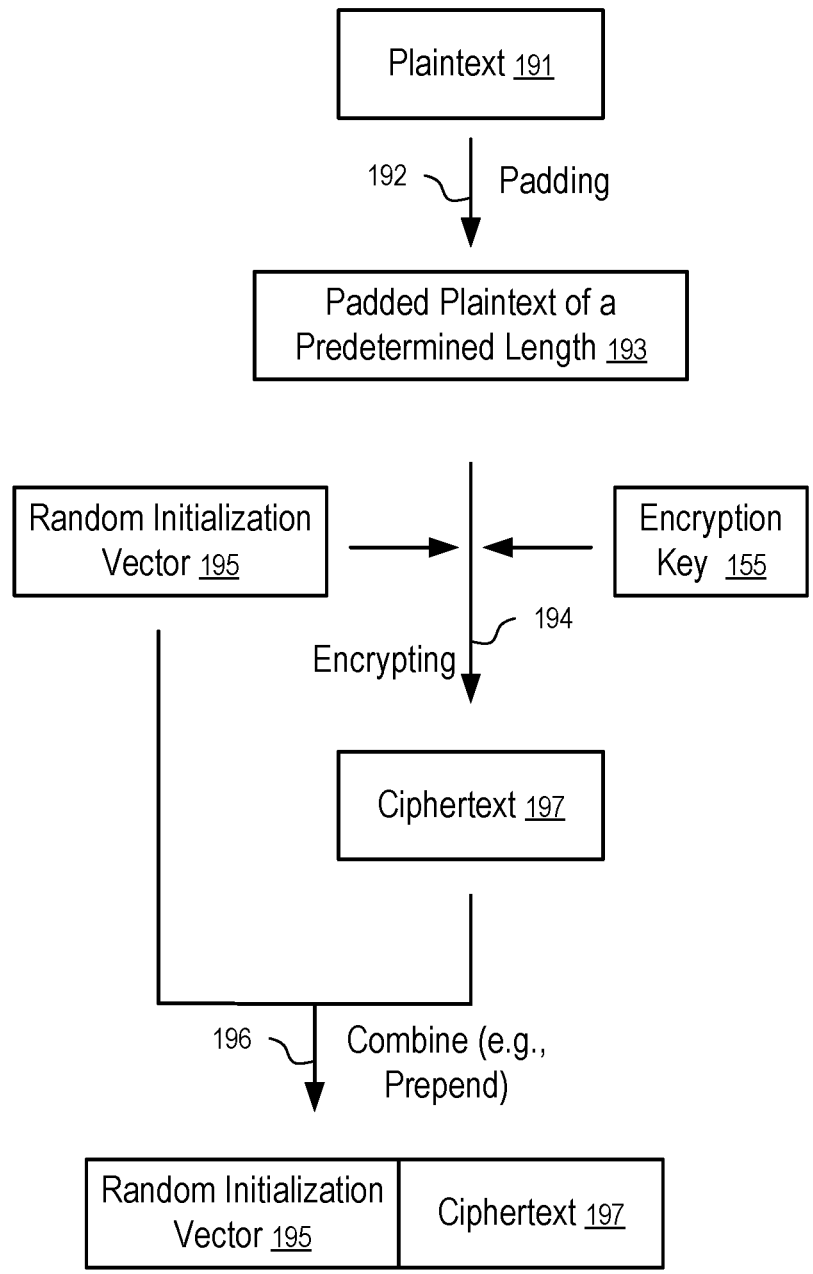
FIG. 4 shows an encryption process according to one embodiment.

FIG. 4 shows an encryption process according to one embodiment. For example, the operation of encrypting (183) in FIG. 3 can be performed using the encryption process of FIG. 4. However, other encryption process can be used to implement the operation of encrypting (183) in FIG. 3.

In FIG. 4, a plaintext (191) is converted into a ciphertext (197) using the encryption key (155). An operation of padding (192) is performed to generate a padded plaintext of a predetermined length (193). For example, Public Key Cryptography Standards (PKCS) #7 padding scheme can be used to generate the padded plaintext (193). Other padding schemes can also be used.

In FIG. 4, a random initialization vector (195) is generated for the encryption of the padded plaintext (193) using encryption key (155). The operation of encrypting (194) can be formed using a symmetric encryption method, such as the Advanced Encryption Standard (AES) in Galois/Counter Mode (GCM), to generate the ciphertext (197). The random initialization vector (195) and the ciphertext (197) are combined and stored. For example, the random initialization vector (195) can be prepended to the ciphertext (197) for storage.

To decrypt the ciphertext (197), the combined random initialization vector (195) and ciphertext (197) is retrieved from data storage (e.g., secured data (149)). After separating the random initialization vector (195) and the ciphertext (197) according to a predetermined rule, the encryption key (155) and the recovered random initialization vector (195) are used to decrypt the ciphertext (197) into the padded plaintext (193). Removing the padding (192) results in the plaintext (191).

Figure 5:
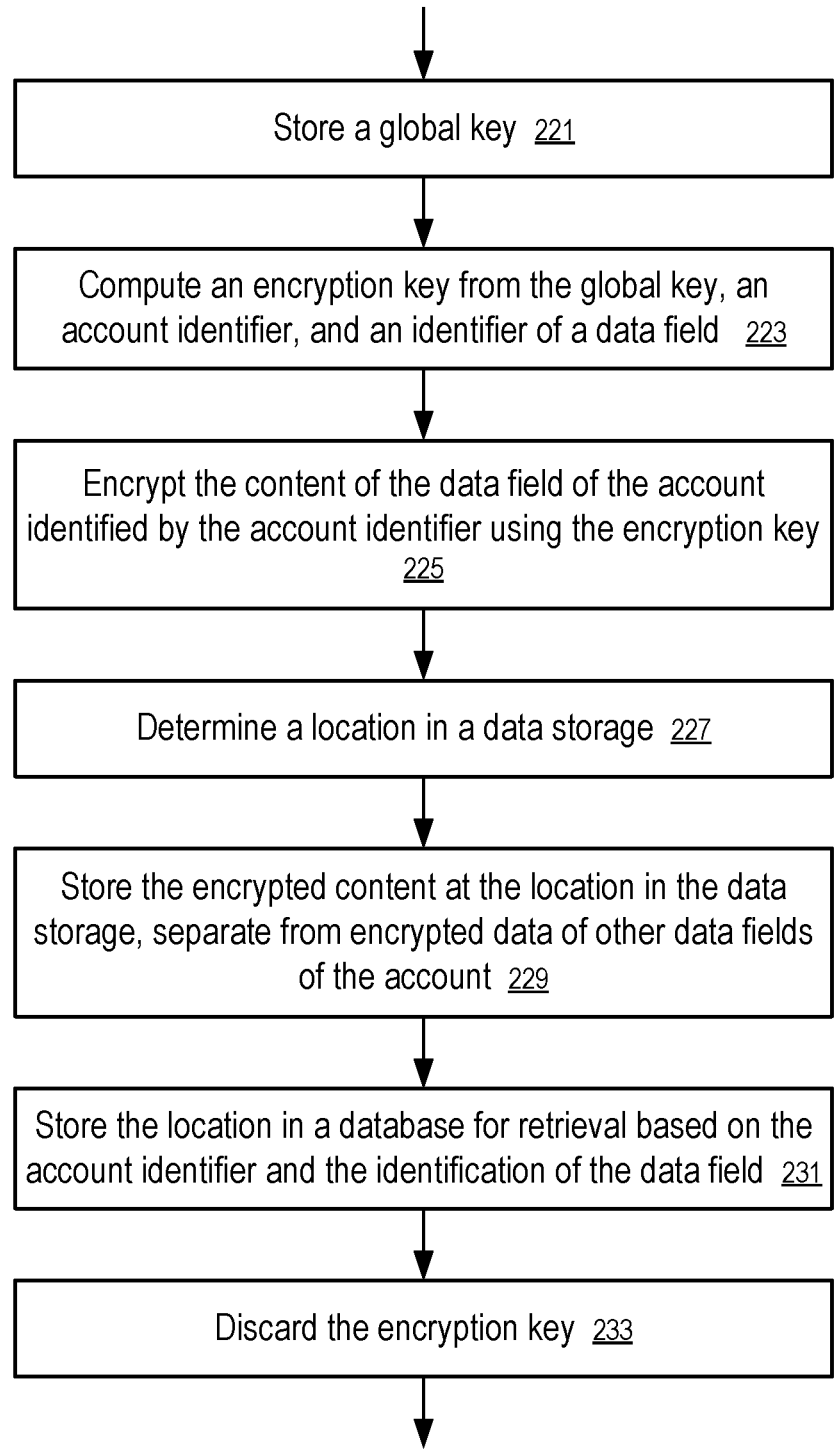
FIG. 5 shows a method to store the data of a data field according to one embodiment.

FIG. 5 shows a method to store the data of a data field according to one embodiment. For example, the method of FIG. 5 can be used to implement the data storage technique of FIG. 2 in the computer system of FIG. 1.

In FIG. 5, a computing device is configured to: store (221) a global key (139) (e.g., at a secure location); compute (223) an encryption key (155) from the global key (139), an account identifier (151), and an identifier (153) of a data field (e.g., in response to a query that provides the identifier (151) of the user account (137) and the identifier (153) of a data field (e.g., 161, 162, 163, 164, . . . , 169) of personally identifiable information); encrypt (225), using the encryption key (155), the content of the data field (157) of the user account (137) identified by the account identifier (151); determine (227) a location in a data storage; store (229) the encrypted content (159) at the location in the data storage, separate from encrypted data of other data fields of the account (137); store (231) the location in a database for retrieval based on the account identifier (151) and the identifier (153) of the data field; and discard (233) the encryption key (155).

Preferably, the computing (223) of the encryption key (155) from the global key (139), the account identifier (151), and the identifier (153) of the data field is performed using a computation-intensive and resource-intensive method to prevent and/or deter a brute-force attack when the encrypted content stored in the data storage (e.g., secured data (149)) is stolen.

The encrypting (225) of the content of the data field of the user account (137) can be performed using a symmetric encryption method such that the encrypted content can be decrypted using the same encryption key (155).

Preferably, the location database is secured in a storage device/system that is separate from the storage device/system for the encrypted content of data fields of user accounts. For example, the master device (129) may maintain the location database in a network area that is separate from the storage area of the secured data (149) that contains the encrypted content of data fields of user accounts. Such an arrangement reduces the risk of the location database and secured data (149) being stolen together.

For example, the key master may implement an application programming interface (API) that allows the server system (103) to submit a query specifying parameters such as the account identifier (151) and the identifier (153) of a data field to be accessed. In response, the key master validates the access request and if the access is determined to be authorized, computes the encryption key (155) and retrieves the location. Using the encryption key (155) and the location, the server system (103) can encrypt the content of the data field for storage at the location in the secured data (149), or retrieve the encrypted content of the data field from the location in the secured data (149) and decrypt the encrypted content. The separate storage and separate access control of encrypted contents and their locations in the secured data (149) enhance the protection of the contents for the privacy of the users of the server system (103).

Preferably, the encryption key (155) and the storage location identified by the key master (129) are not stored in the computing system. Once the key master (129) provides the query response to the server system (103), the key master (129) purges the encryption key (155) and the storage location from its memory such that the storage location is stored by the key master (129) only in its location database, preferably in an encrypted format and the encryption key (155) is not stored. Once the encryption key (155) and the storage location identified are used by the server system (103) for a particular operation (e.g., to store the content, or retrieve the content of a data field of a particular account), the encryption key (155) and the storage location are discarded purged such that a subsequent operation on the data field requires a query to the key master to re-obtain the encryption key (155) and the storage location for the user account identified by the account identifier (151) and the data field identified by the identifier (153).

Figure 6:
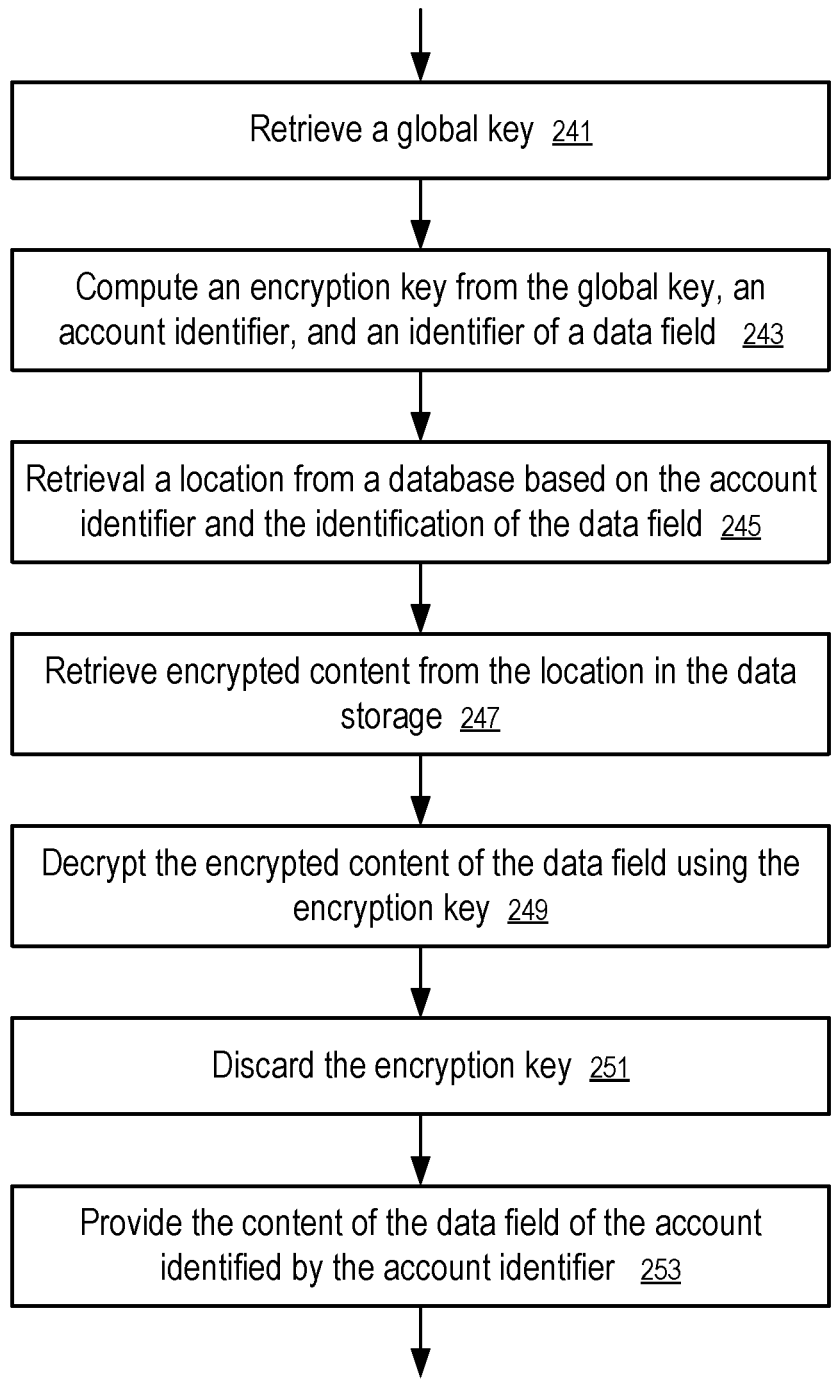
FIG. 6 shows a method to retrieve the data of a data field stored according to one embodiment.

FIG. 6 shows a method to retrieve the data of a data field stored according to one embodiment. For example, the method of FIG. 6 can be used to retrieve data stored using the technique of FIG. 2 in the computer system of FIG. 1.

In FIG. 6, a computing device is configured to: retrieve (241) a global key (139) (from a secure location); compute (243) an encryption key (155) from the global key (139), an account identifier (151), and an identifier (153) of a data field (e.g., in response to a query that provides the identifier (151) of the user account (137) and the identifier (153) of a data field (e.g., 161, 162, 163, 164, . . . , 169) of personally identifiable information); retrieval (245) a location from a database based on the account identifier (151) and the identifier (153) of the data field; retrieve (247) encrypted content (159) from the location in the data storage; decrypt (249) the encrypted content (159) of the data field using the encryption key (155); discard (251) the encryption key (155); and provide (253) the content of the data field (157) of the user account (137) identified by the account identifier (151).

Preferably, an application programming interface (API) is configured to provide authorized access to the data fields (e.g., 161, 162, 163, 164, . . . , 169) stored as the secured data (149) in the data storage (105). To access a data field (e.g., 161, 162, 163, 164, . . . , or 169) of the user account (137), a query made using the API provides the identifier (153) of the data field and the identifier (151) of the user account (137). After the query is determined to have the privilege to access the data field, the server system (103) obtains, from the key master, the encryption key (155) and the storage location of the data field for the user account (137). The encryption key (155) can be used to generate the encrypted content (159) for storage at the location, or decrypt the encrypted content (159) retrieved from the location.

For example, a system as illustrated in FIG. 1 hosts a three-dimensional virtual reality world. The system includes: a key master (129); a server system (103); a first data storage device (105) controlled by the server system and storing: a three-dimensional model (131) of the virtual reality world; and avatar models (135) representing residences of the virtual reality world. The key master (139) controls a location database (138) stored on a second data storage device separate from the first data storage device (105) which also stores a global key (139).

Users of accounts (e.g., 137) to access the three-dimensional virtual reality world hosted on the system have personally identifiable information, such as first name (161), last name (162), email address (163), . . . , phone number (169). Each respective account (e.g., 137) is identified by an account identifier (151); and each respective data field of personally identifiable information of the respective account is identified by a data field identifier (153).

For each combination of an account identifier (151) and a data field identifier (153), the key master (129) dynamically generates an encryption key (155) by applying a resource-intensive password-based key derivation function, such as the scrypt function, on the global key, the account identifier, and the data field identifier, just in time for the use of the encryption key (e.g., for encryption of the content of respective data field of the personally identifiable information of the respective account, or for the decryption of the corresponding encrypted content).

The encrypted contents of the data fields of a user account (137) are stored in the first data storage device (105) (e.g., as part of the secured data (149)) at substantially random locations such that the secured data (149) as a whole does not have any indication of the correlation of the encrypted content of different data fields as being corresponding to one account. The identifications of the random locations of the encrypted contents of the data fields of the user account (137) are stored in the location database (138).

The encryption key (155) is transient in the system illustrated in FIG. 1 and not stored. The encryption key (155) is computed when it is needed for encryption or decryption.

Preferably, the identification of the storage location of the encrypted content of each data field is also transient in the system then inside the location database (138). The identifications of the storage locations are stored in the location database (138) in an encrypted form, encrypted using the same encryption of the corresponding encrypted content of the data field, or a different key.

For example, the server system (103) may query the key master (129) for the encryption (155) using the account identifier (151), and the data field identifier (153) to obtain the encryption key (151) and the identification of the storage location for the corresponding data field and the user account (137).

Searchable Data

In FIG. 1, the server system (103) may optionally provide an application programming interface (API) to facilitate the search of the accounts/identities of the users of the user accounts (e.g., 137) for authorized uses.

To facilitate the search, the data storage (105) of the server system (105) stores a set of records to correlate the searchable elements of personally identifiable information to the accounts and/or identities of the users of the user accounts (e.g., 137). Such records can be stored as part of the secured data (149) in the data storage (105).

Some of the techniques of the present disclosure protect the searchable records from unauthorized access, such that even if the records are stolen, it is still difficult to decrypt the data to connect the accounts and/or identities of the users of the user accounts (e.g., 137) to their respective searchable elements that may include at least partial or complete content of the data fields of personally identifiable information (e.g., names, phone numbers, email addresses).

Figure 7:
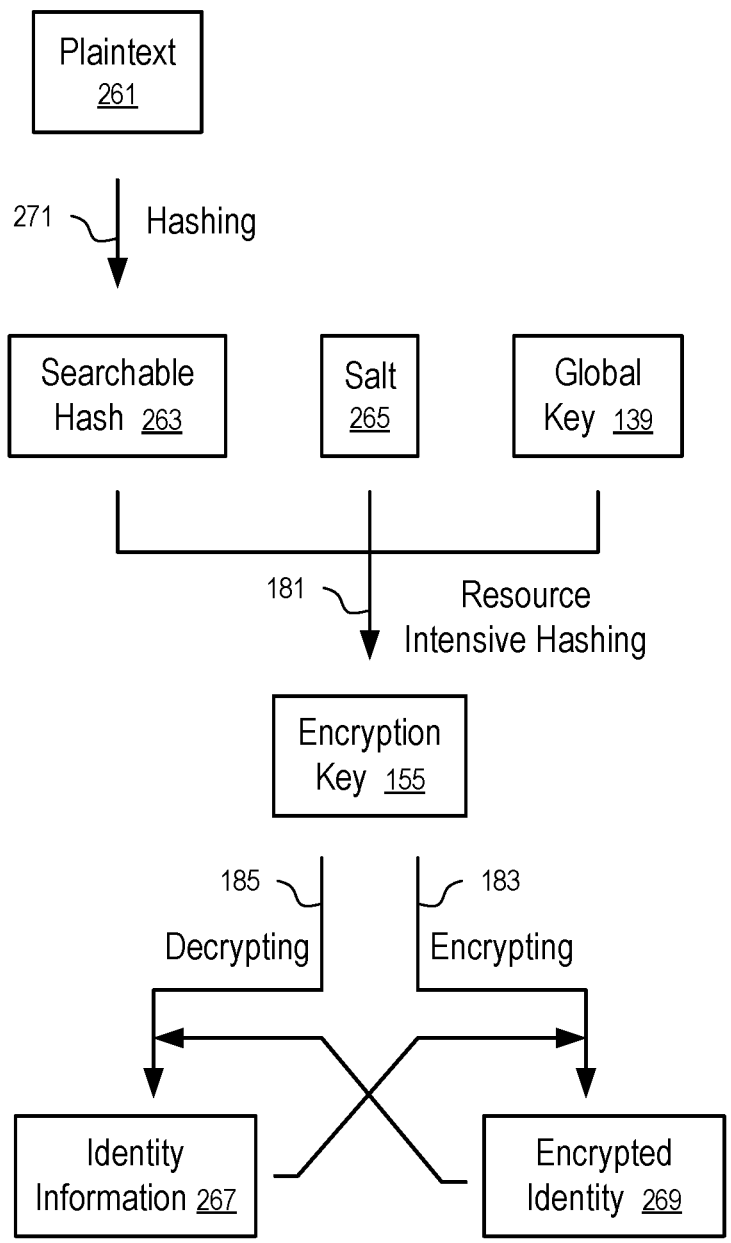
FIG. 7 shows a method to index an identity to facilitate a search according to one embodiment.

FIG. 7 shows a method to index an identity to facilitate a search according to one embodiment. For example, the method of FIG. 7 can be implemented in the system of FIG. 1, where a user of an account (137) has fields (161, 162, 163, 164, . . . , 169) of personally identifiable information stored in a secure way illustrated in FIG. 2.

In FIG. 7, a searchable record is generated to establish a connection between the plaintext (261) of a searchable element (e.g., at least part of a name, phone number, email address) with the identity information (267) in an encrypted form. The searchable element may be the complete content of a field of personally identifiable information (e.g., name, phone number, email address), or a portion of the complete content of the field. Examples of the identity information (267) include the account identifier (151) of the user account (137), a combination of the account identifier (151) and the user ID of the server system (103) that uniquely identifies the user among a plurality of users of the server system (103), a combination of the account identifier (151) and a location of a field of personally identifiable information in the secured data (149), or a combination of the account identifier (151) and the complete content of a data field of personally identifiable information in the secured data (149) that matches with the partial content represented by the plaintext (261), etc.

When the technique of FIG. 7 is used, it is difficult to decrypt (e.g., using brute-force attacks), without authorization, the relation between the plaintext (261) and the identity information (267) embedded in the searchable record.

In FIG. 7, the plaintext (261) of a searchable element (e.g., the complete or partial name, phone number, email address) is converted to a searchable hash (263) through the operation of hashing (271) performed using a cryptographic hash function. Since a cryptographic hash function is used to perform the hashing, it is difficult to reconstruct the plaintext (261) from the searchable hash (263) provided in a searchable record.

In FIG. 7, the searchable hash (263) is combined with a suitable salt (e.g., a random number, a date and time, etc.) and a global key (139) to generate an encryption key (155) that is specific for a searchable record generated to facilitate the connection between the plaintext (261) and the identity information (267). Different salts (e.g., 265) can be used for connecting the same plaintext (261) to different identity information (e.g., 267). Preferably, the encryption key (155) is generated through resource intensive hashing (181) (e.g., using a resource-intensive password-based key derivation function, such as the scrypt function).

The global key (139) used for the generation of the encryption key (155) for the plaintext (261) to facilitate the search as illustrated in FIG. 7 may be the same as the global key (139) used for the generation of the encryption key (155) for a data field of an account identifier (151) identified by the data field identifier (153) as illustrated in FIG. 3. Alternatively, separate global keys (139) can be used for the generation of the encryption key (155) for a particular data field of a particular user account as illustrated in FIG. 3, and for the generation of the encryption key (155) of the identity information (267) associated with the searchable plaintext (261).

In FIG. 7, the identity information (267) is encrypted (183) using the encryption key (155) to generate the encrypted identity (269), which is difficult to decrypt without the global key (139).

Figure 8:
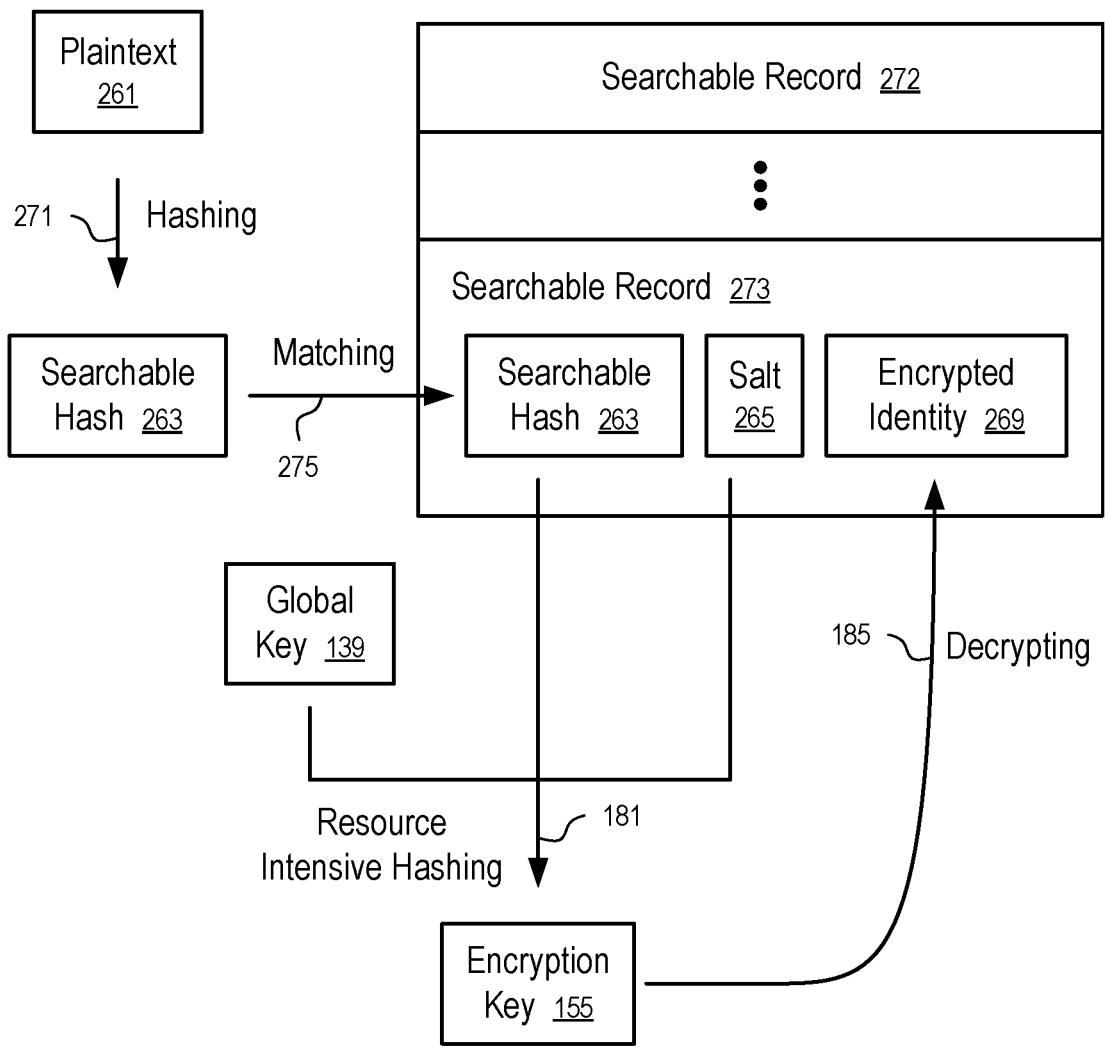
FIG. 8 shows a method to perform a search of an identity according to one embodiment.

A searchable record relates the searchable hash (263) to the encrypted identity (269) (and the salt (265)) such that from the searchable hash (263), the server system (103) can locate the encrypted identity (269) and decrypt (267) the encrypted identity (269) using the encryption key (155), as illustrated in FIG. 8.

In one implementation, the server system (103) queries the key master (129) to obtain the encryption key (155) just in time for encrypting (183) the identity information (267), or for decrypting (185) the encrypted identity (269). The encryption key (155) is transient in the computer system that includes the key master (129) and the server system (103) and their memory/storage devices. The encryption key (155) is not stored in the computer system to force its regeneration when needed for encrypting (183) or decrypting (267), which prevents or deters unauthorized access due to the resource intensive hashing (181) for the generation of the encryption key (155).

In some implementations, the operations of encrypting (183)/decrypting (185) are performed in accordance with the process of FIG. 4.

FIG. 8 shows a method to perform a search of an identity according to one embodiment. For example, the method of FIG. 8 can be implemented in the system of FIG. 1, where a user of an account (137) has fields (161, 162, 163, 164, . . . , 169) of personally identifiable information stored in a secure way illustrated in FIG. 2.

In FIG. 8, a searchable record (273) includes data fields, such as a searchable hash (263), a salt (265), and an encrypted identity (269) generated using the method of FIG. 7.

In response to receiving the plaintext (261) as a search criterion, the server system (103) generates the searchable hash (263) by applying the hashing (271) in a way as the searchable hashing (263) is generated in FIG. 7. The server system (103) searches a set of searchable records (e.g., 272, . . . , 273) stored as part of the secured data (149) to identify a searchable record (273) that has the searchable hash (263) matching (275) with the searchable hash (263) converted from the plaintext (261) that is received as a search criterion. In FIG. 8, the searchable record (273) is the matching record of the plaintext (261) among the set of searchable records (e.g., 272, . . . , 273) stored as part of the secured data (149). In general, there may be one or more matching records, or no matching records.

From the matching searchable record (273), the server system (103) retrieves the salt (265) and the encrypted identity (269). Based on the searchable hash (263), the salt (265) and the global key (139), an encryption key (155) is generated (e.g., by the key master (129)) from resource intensive hashing (181), just in time for the decrypting (185) of the encrypted identity (269) retrieved from the matching searchable record (273). Upon completion of the operation of decrypting (185), the encryption key (155) is discarded, erased, and/or purged from the memory/storage of the server system (103). The result of the decrypting (185) is included in the search result or used to generate the search result.

In some implementations, the hashing (271) in FIG. 7 is performed using one of a plurality of hash functions. During the search, the server system (103) uses the plurality of hash functions to generate a plurality of possible searchable hashes (e.g., 263) to find the matching searchable records (273). Optionally, the searchable record (273) also stores an identification of the hash function that is used to generate the searchable hash (263) that is included in the searchable record (273); and the server system (103) finds the matching searchable record (273) that contains 1) the searchable hash (263) matches with a possible searchable hash (e.g., 263) and 2) an identification of the hash function that matches with the hash function used to generate the possible search hash (e.g., 263) for the plaintext (261) received as the search criterion. The encrypted identity (269) provided by the matching searchable record (273) is decrypted using the encryption key (155) specific for the matching searchable record (273).

Figure 9:
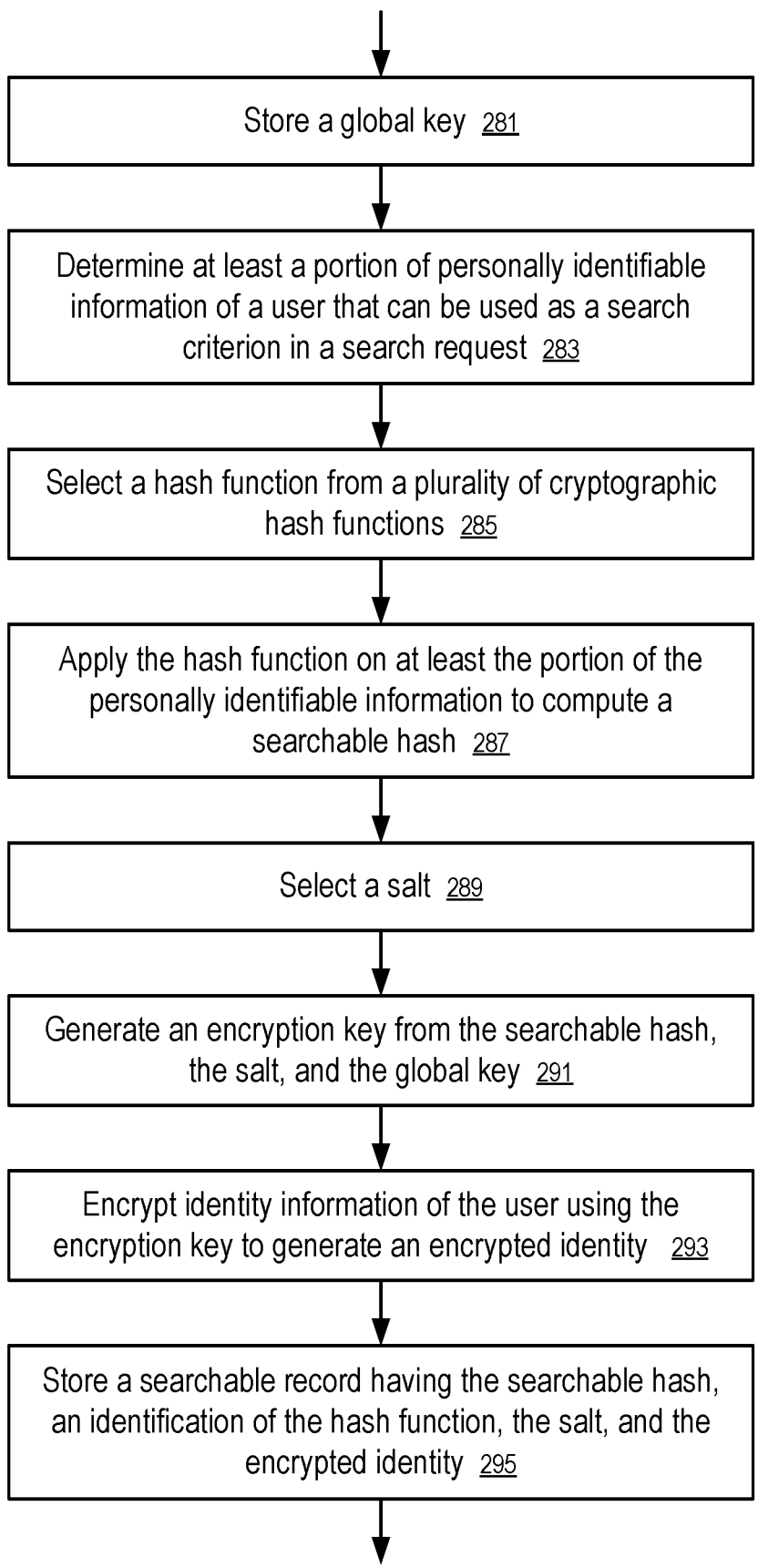
FIG. 9 shows a method to generate a searchable record containing personally identifiable information according to one embodiment.

FIG. 9 shows a method to generate a searchable record containing personally identifiable information according to one embodiment. For example, the method of FIG. 9 can be implemented in the system of FIG. 1, where a user of an account (137) has fields (161, 162, 163, 164, . . . , 169) of personally identifiable information optionally stored in a secure way illustrated in FIG. 2.

In FIG. 9, a computer system is configured to: store (281) a global key (139); determine (283) at least a portion of personally identifiable information of a user that can be used as a search criterion in a search request; select (285) a hash function from a plurality of cryptographic hash functions; apply (287) the hash function on at least the portion of the personally identifiable information to compute a searchable hash (263); select (289) a salt (265); generate (291) an encryption key (155) from the searchable hash (263), the salt (265), and the global key (139), in a way as illustrated in FIG. 7; encrypt (293) identity information (267) of the user (e.g., the account identifier (151) of the user of the account (137)) using the encryption key (155) to generate an encrypted identity (269); and store (295) a searchable record (273) having the searchable hash (263), an identification of the hash function, the salt (265), and the encrypted identity (269). The method of FIG. 9 can be repeated to generate a set of searchable records (272, . . . , 273) that connect various search criteria to identity information of users of the system of FIG. 1.

Preferably, after the encrypted identity (269) is generated, the encryption key (155) is discarded and/or purged from the computer system to reduce the risk that the encryption key (155) is stolen with the search records (272, . . . , 273).

Preferably, the encryption key (155) is generated from the searchable hash (263), the salt (265), and the global key (139) through a resource intensive hashing (181) using a password-based key derivation function, such as the scrypt function.

Optionally, the identity information (267) includes the personally identifiable information, when the searchable hash (263) includes only a portion of the personally identifiable information. Thus, the search record allows the discovery of the personally identifiable information based on a portion of the personally identifiable information through a search performed for an authorized user.

Figure 10:
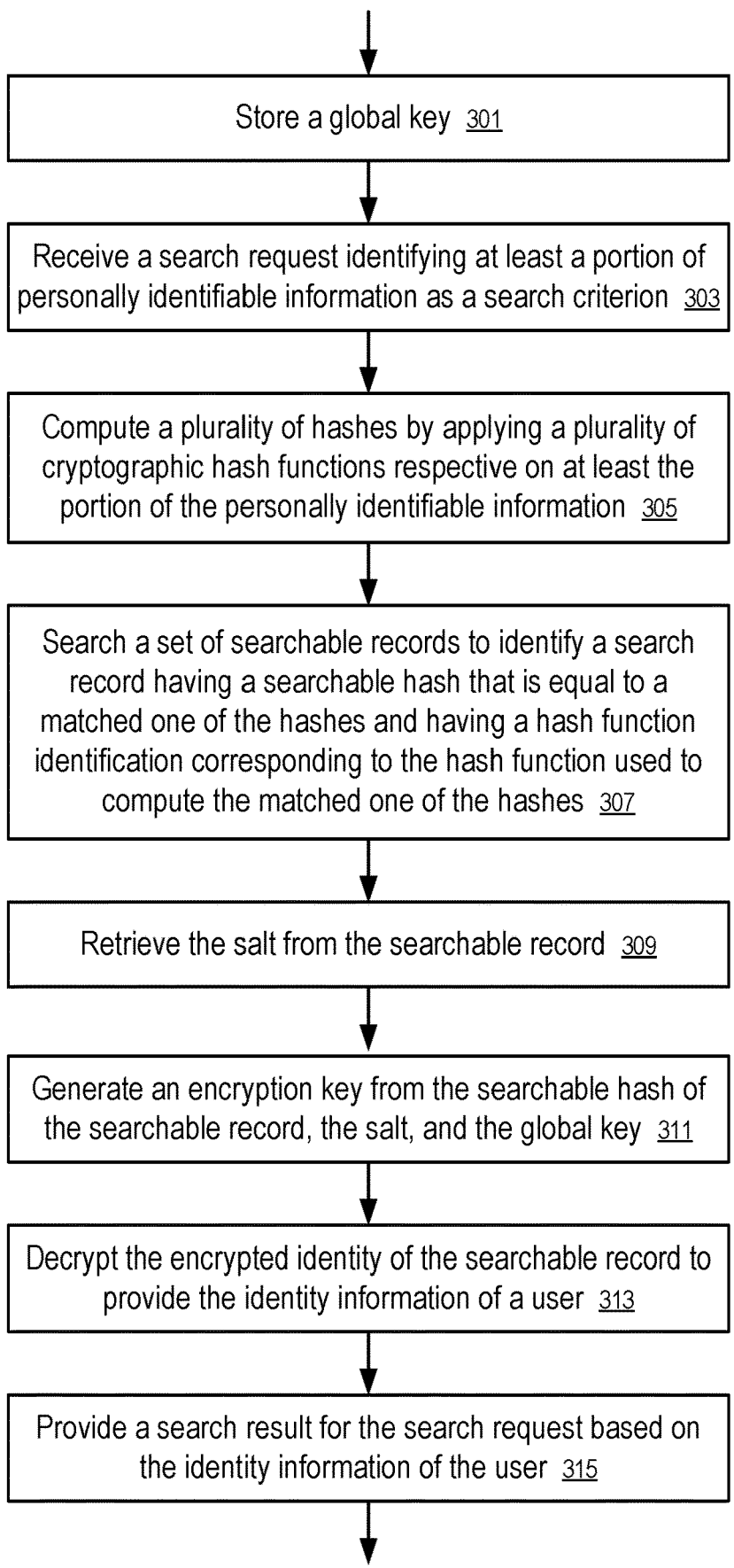
FIG. 10 shows a method to search for personally identifiable information according to one embodiment.

FIG. 10 shows a method to search for personally identifiable information according to one embodiment. For example, the method of FIG. 10 can be implemented in the system of FIG. 1, where a set of searchable records (272, . . . , 273) generated using a method of FIG. 9 are stored to facilitate the search and a user of an account (137) has fields (161, 162, 163, 164, . . . , 169) of personally identifiable information optionally stored in a secure way illustrated in FIG. 2.

In FIG. 10, a computer system is configured to: store (301) a global key (139); receive (303) a search request identifying at least a portion of personally identifiable information as a search criterion; compute (305) a plurality of hashes (e.g., 263) by applying a plurality of cryptographic hash functions respective on at least the portion of the personally identifiable information; search (307) a set of searchable records (e.g., 272, . . . , 273) to identify a searchable record (273) having a searchable hash (263) that is equal to a matched one of the plurality of hashes and having a hash function identification corresponding to the hash function used to compute the matched one of the plurality of hashes; retrieve (309) the salt (265) from the searchable record (273); generate (311) an encryption key (155) from 1) the searchable hash (263) of the searchable record (273), 2) the salt (265) retrieved from the searchable record (273), and 3) the global key (139); decrypt (313) the encrypted identity (269) of the searchable record (273) to provide the identity information (267) of a user; and provide (315) a search result for the search request based on the identity information (267) of the user.

In general, multiple searchable records (273) may have the same searchable hash (263) and/or the same hash function identification. Thus, a search performed based on the searchable hash (263) (e.g., generated from the use of a portion of personally identifiable information) may lead to multiple identity information (267) of different users. The search result may provide information about the multiple users identified through the set of matching searchable records (e.g., 273).

The computer system may include a key master (129), a server system (103), a first data storage device (105) controlled by the server system (103), and a second data storage device controlled by the key master (129) and storing a global key (139).

The first data storage device (105) may store: a three-dimensional model (131) of a virtual reality world; avatar models (135) representing residences of the virtual reality world; and a set of searchable records (e.g., 273, as part of the secured data (149)). Each respective record (e.g., 273) in the set of searchable records (272, . . . , 273) includes: a searchable hash (e.g., 263) of at least a portion of personally identifiable information; and an encrypted identity (269), where the encrypted identity is decryptable, using an encryption key (155) generated based at least in part on the searchable hash (263) and the global key (139), to provide an identity of a user having the personally identifiable information. The identity of the user uniquely identifying the user among users of the three-dimensional virtual reality world.

In response to a search request having at least a portion of first personally identifiable information, the server system (103) generates, using a first cryptographic hash function, a first searchable hash (263) from at least the portion of the first personally identifiable information; and identifies, from the set of searchable records (272, . . . , 273), a first searchable record (273) having a searchable hash (263) that is equal to the first searchable hash.

After the first searchable record (273) is identified for the search request, the server system (103) requests the key master (129) to generate a first encryption key (155) from the searchable hash (263) provided by the first searchable record (273) and the global key (129) controlled by the key master (129). The server system (103) extracts, from the first searchable record (273), a first encrypted identity (269) and uses the first encryption key (155) to decrypt the first encrypted identity (269) and obtain a first identity of a first user of the three-dimensional virtual reality world. Using the first identity of the first user, the server system (103) provides a search result that is responsive to the search request that has at least the portion of first personally identifiable information.

Preferably, the presence of the first encryption key (155) in the computer system is transient. The first encryption key (155) is computed just in time for the encrypting (183) of the identity information (267), or for the decrypting (185) of the encrypted identity (269).

Preferably, the computation of the first encryption key (155) is based on a resource-intensive password-based key derivation function, such as a scrypt function.

In one implementation, the key master (129) has an application programming interface that allows the server system (103) to query the key master (129) for the first encryption key (155) using: the searchable hash (263) of the first searchable record (273) that is equal to the first searchable hash; and the salt (265) retrieved from the first searchable record (273).

Optionally, the first identity of the first user decrypted from the encrypted identity (269) includes both an account identifier of the user account (137) of the first user and the first personally identifiable information, where the searchable hash (263) is based on only a portion of the first personally identifiable information. Thus, the first searchable record (273) connects a portion of the first personally identifiable information to the entire first personally identifiable information to facilitate searching.

To generate the first searchable record (273) to facilitate the search, the server system (103) is configured to: compute the searchable hash (263) of the first searchable record (273) from at least the portion of the first personally identifiable information of the first user that can be used as a search criterion, determine a salt (265) (e.g., a random number), request the key master (129) to compute the first encryption key (155) from the salt (265), the first searchable hash (263), and the global key (139) that is controlled by the key master (129); encrypt, using the first encryption key (155), the first identity of the first user to generate the first encrypted identity (269); and discard and/or purge the first encryption key (155).

For example, the purging of the encryption key (155) can be performed in response to the completion of the encryption (183) made using the encryption key (155), and/or in response to the completion of the decryption (185) made using the encryption key (155). Alternatively, the encryption key (183) generated for a current searchable record (273) is overwritten by the encryption key generated for a next searchable record during the processing of a set of records; and the last encryption key generated for the last one of the set of records can be purged upon completion of the processing of the set of records.

Figure 11:
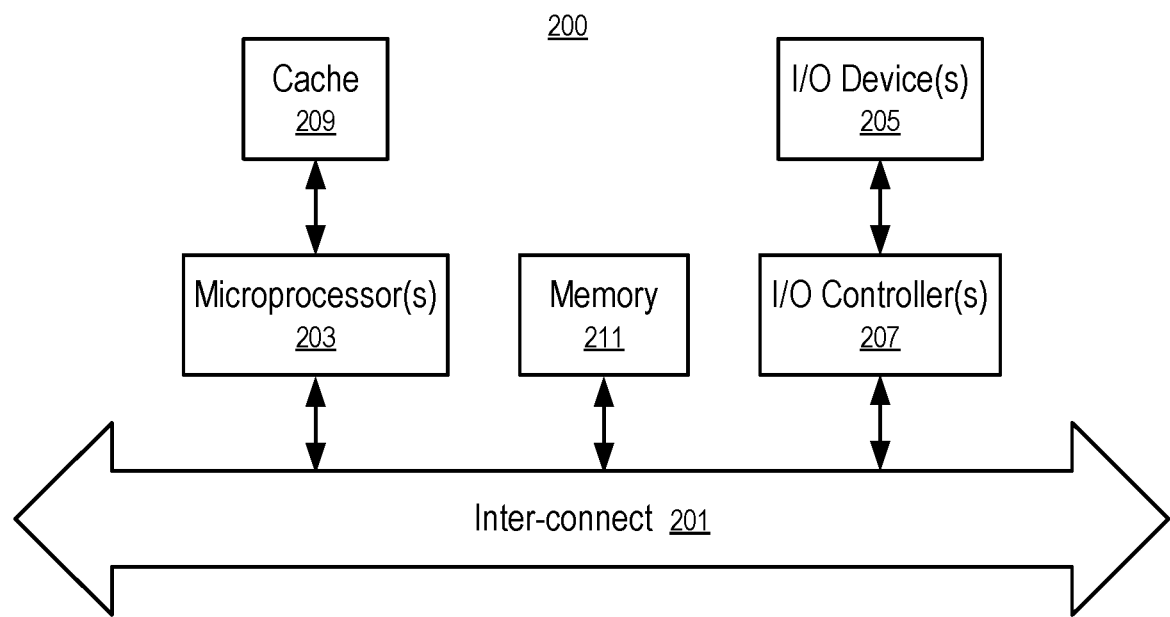
FIG. 11 shows a data processing system on which the methods of the present disclosure can be implemented.

Each of the client devices (107, . . . , 109), the server system (103), the location database (138), the data storage (105), and/or the key master (129) can be implemented in the form of one or more data processing systems illustrated in FIG. 11, with more or fewer components.

The present disclosure includes the methods discussed above, computing apparatuses configured to perform methods, and computer storage media storing instructions which when executed on the computing apparatuses causes the computing apparatuses to perform the methods.

FIG. 11 shows a data processing system on which the methods of the present disclosure can be implemented. While FIG. 11 illustrates various components of a computer system, it is not intended to represent any particular architecture or manner of interconnecting the components. Other systems that have fewer or more components than those shown in FIG. 11 can also be used.

In FIG. 11, the data processing system (200) includes an inter-connect (201) (e.g., bus and system core logic), which interconnects a microprocessor(s) (203) and memory (211). The microprocessor (203) is coupled to cache memory (209) in the example of FIG. 11.

In FIG. 11, the inter-connect (201) interconnects the microprocessor(s) (203) and the memory (211) together and also interconnects them to input/output (I/O) device(s) (205) via I/O controller(s) (207). I/O devices (205) may include a display device and/or peripheral devices, such as mice, keyboards, modems, network interfaces, printers, scanners, video cameras and other devices known in the art. When the data processing system is a server system, some of the I/O devices (205), such as printers, scanners, mice, and/or keyboards, are optional.

The inter-connect (201) includes one or more buses connected to one another through various bridges, controllers and/or adapters. For example, the I/O controllers (207) include a USB (Universal Serial Bus) adapter for controlling USB peripherals, and/or an IEEE-1394 bus adapter for controlling IEEE-1394 peripherals.

The memory (211) includes one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Other Aspects

The description and drawings are illustrative and are not to be construed as limiting. The present disclosure is illustrative of inventive features to enable a person skilled in the art to make and use the techniques. Various features, as described herein, should be used in compliance with all current and future rules, laws and regulations related to privacy, security, permission, consent, authorization, and others. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

The use of headings herein is merely provided for ease of reference, and shall not be interpreted in any way to limit this disclosure or the following claims.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not other embodiments. Unless excluded by explicit description and/or apparent incompatibility, any combination of various features described in this description is also included here. For example, the features described above in connection with "in one embodiment" or "in some embodiments" can be all optionally included in one implementation, except where the dependency of certain features on other features, as apparent from the description, may limit the options of excluding selected features from the implementation, and incompatibility of certain features with other features, as apparent from the description, may limit the options of including selected features together in the implementation.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A computing system, comprising:
   a key master having a global key;
   a server system; and
   a data storage device controlled by the server system and configured to store:
     avatars of a virtual reality world; and
     a set of searchable records, wherein each respective record in the set of searchable records includes:
       a searchable hash of at least a portion of personally identifiable information, wherein different portions of the personally identifiable information are stored in randomized locations; and
       an encrypted identity, wherein the encrypted identity is decryptable to provide an identity of a user having the personally identifiable information; and
   wherein, in response to a search request having at least a portion of first personally identifiable information, the server system is configured to:
     generate, using a first cryptographic hash function, a first searchable hash from at least the portion of the first personally identifiable information; and
     identify, from the set of searchable records, a first searchable record having a searchable hash that is equal to the first searchable hash;
   wherein, after the first searchable record is identified for the search request, the key master is configured to generate a first encryption key from the first searchable hash and the global key,
   wherein the first encryption key is not stored in the data storage device; and
   wherein the server system is configured to provide a search result responsive to the search request by:
     extracting, from the first searchable record, a first encrypted identity; and
     decrypting, using the first encryption key, the first encrypted identity to obtain a first identity of a first user of the virtual reality world.

2. The computer system of claim 1, wherein presence of the first encryption key is transient in the computer system.

3. The computer system of claim 2, wherein the server system queries the key master for the first encryption key using:
   the searchable hash of the first searchable record that is equal to the first searchable hash; and
   a salt retrieved from the first searchable record.

4. The computer system of claim 3, wherein the first identity of the first user includes an account identifier of the first user and the first personally identifiable information.

5. The computer system of claim 3, wherein the first encryption key is generated using a resource-intensive password-based key derivation function.

6. The computer system of claim 5, wherein the function is a scrypt function.

7. A method, comprising:
   storing, in a computer system but separately from a global key, a set of searchable records, wherein each respective record in the set of searchable records includes:
     a searchable hash of at least a portion of personally identifiable information, wherein different portions of the personally identifiable information are stored in randomized locations; and
     an encrypted identity, wherein the encrypted identity is decryptable to provide an identity of a user having the personally identifiable information; and
   in response to a search request having at least a portion of first personally identifiable information:
     generating, by the computer system using a first cryptographic hash function, a first searchable hash from at least the portion of the first personally identifiable information;
     determining, by the computer system and from the set of searchable records, a first searchable record having a searchable hash that is equal to the first searchable hash;
     generating, by the computer system, a first encryption key from the first searchable hash and the global key;
     extracting, by the computing system from the first searchable record, a first encrypted identity;
     decrypting, by the computing system using the first encryption key, the first encrypted identity to obtain a first identity of a first user of the computer system; and
     providing, by the computing system, a search result based at least in part on the first identity of the first user.

8. The method of claim 7, wherein the first searchable record in the set of searchable records further includes a salt;

and the first encryption key is generated from the salt, the first searchable record, and the global key.

9. The method of claim 8, wherein the first encryption key is generated, using a resource-intensive password-based key derivation function, from the salt, the first searchable hash, and the global key.

10. The method of claim 9, wherein the resource-intensive password-based key derivation function is a scrypt function.

11. The method of claim 10, further comprising:
generating the first searchable record by:
computing the searchable hash of the first searchable record from at least the portion of the first personally identifiable information of the first user;
determining the salt;
computing the first encryption key from the salt, the first searchable hash, and the global key; and
encrypting, using the first encryption key, the first identity of the first user to generate the first encrypted identity.

12. The method of claim 11, wherein the first searchable record further includes an identification of the first cryptographic hash function selected from a plurality of hash functions and used to generate the searchable hash of the first searchable record.

13. The method of claim 12, wherein the determining of the first searchable record is based on computing, using the plurality of hash functions, a plurality of hashes of at least the portion of the first personally identifiable information and finding the first searchable record having:
a searchable hash that is equal to one of the plurality of hashes; and
an identification of the first cryptographic hash function corresponding to a hash function used to compute the one of the plurality of hashes.

14. The method of claim 13, wherein the first identity of the first user includes an account identifier of the first user uniquely identifying a user account of the first user among a plurality of user accounts for accessing the computer system.

15. The method of claim 14, wherein the first encryption key is not stored in the computer system.

16. The method of claim 15, further comprising:
purging, from the computer system, the first encryption key computed during the generating of the first searchable record, after the encrypting of the first identity of the first user to generate the first encrypted identity.

17. The method of claim 16, further comprising:
purging, from the computer system, the first encryption key generated in response to the first searchable record being identified for the search request, after the decrypting of the first encrypted identity to obtain the first identity of the first user.

18. A non-transitory computer storage medium storing instructions which, when executed on a computer system, cause the computer system to perform a method, the method comprising:
storing, in a computer system but separately from a global key, a set of searchable records, wherein each respective record in the set of searchable records includes:
a searchable hash of at least a portion of personally identifiable information, wherein different portions of the personally identifiable information are stored in randomized locations; and
an encrypted identity, wherein the encrypted identity is decryptable to provide an identity of a user having the personally identifiable information; and
in response to a search request having at least a portion of first personally identifiable information:
generating, by the computer system using a first cryptographic hash function, a first searchable hash from at least the portion of the first personally identifiable information;
determining, by the computer system and from the set of searchable records, a first searchable record having a searchable hash that is equal to the first searchable hash;
generating, by the computer system, a first encryption key from the first searchable hash and the global key, wherein the first encryption key is not stored;
extracting, by the computing system from the first searchable record, a first encrypted identity;
decrypting, by the computing system using the first encryption key, the first encrypted identity to obtain a first identity of a first user of the computer system; and
providing, by the computing system, a search result based at least in part on the first identity of the first user.

19. The non-transitory computer storage medium of claim 18, wherein the method further comprises generating the first searchable record by:
computing the searchable hash of the first searchable record from at least the portion of the first personally identifiable information of the first user;
determining a salt;
computing the first encryption key from the salt, the first searchable hash, and the global key; and
encrypting, using the first encryption key, the first identity of the first user to generate the first encrypted identity.

20. The non-transitory computer storage medium of claim 19, wherein the first searchable record further includes the salt and an identification of the first cryptographic hash function; and the first encryption key is generated by applying a scrypt function to the salt, the first searchable hash, and the global key.

* * * * *